United States Patent
Wang et al.

(10) Patent No.: US 6,857,835 B2
(45) Date of Patent: Feb. 22, 2005

(54) WHEEL END ASSEMBLY WITH LOCKING FASTENER

(75) Inventors: Hui Wang, Ann Arbor, MI (US); Richard L. Seidel, Macomb, MI (US); James A. Levitte, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 48 days.

(21) Appl. No.: 10/241,394

(22) Filed: Sep. 11, 2002

(65) Prior Publication Data

US 2004/0047708 A1 Mar. 11, 2004

(51) Int. Cl.$^7$ .............................................. F16B 39/10
(52) U.S. Cl. ................... 411/204; 411/197; 403/359.5; 403/395.6; 301/35.55; 384/589
(58) Field of Search ................. 411/531, 204, 411/197; 403/359.1, 359.5, 359.6; 464/182, 184; 301/35.63, 35.55; 384/585, 589, 544

(56) References Cited

U.S. PATENT DOCUMENTS

| | | | |
|---|---|---|---|
| 145,783 A | | 12/1873 | Brown |
| 582,599 A | * | 5/1897 | Brownell .................... 384/589 |
| 615,662 A | * | 12/1898 | Callaghan ................... 384/589 |
| 695,081 A | | 3/1902 | Reese |
| 978,096 A | | 12/1910 | Wilson |
| 982,403 A | | 1/1911 | Whitton |
| 1,171,182 A | | 2/1916 | Dibble |
| 1,534,056 A | | 4/1925 | Bellis |
| 1,790,737 A | | 2/1931 | Alborn |
| 1,796,610 A | * | 3/1931 | Modler ....................... 384/585 |
| 2,252,132 A | * | 8/1941 | Mazveskas et al. ...... 301/108.5 |
| 2,609,243 A | * | 9/1952 | Ponnequin ..................... 403/1 |
| 2,890,910 A | * | 6/1959 | Bern ....................... 301/35.63 |
| 2,956,632 A | * | 10/1960 | Forbush et al. ............. 180/385 |
| 3,112,965 A | * | 12/1963 | Popiel ........................ 384/585 |
| 3,308,682 A | * | 3/1967 | Puidokas ..................... 74/607 |
| 3,851,690 A | | 12/1974 | Wing et al. |
| 3,985,393 A | * | 10/1976 | Jovick ........................ 301/131 |
| 4,210,372 A | * | 7/1980 | McGee et al. .............. 384/584 |
| 4,354,711 A | * | 10/1982 | Main ....................... 301/35.63 |
| 4,433,877 A | * | 2/1984 | Colanzi ...................... 384/544 |
| 4,502,738 A | * | 3/1985 | Nauta ........................ 384/477 |
| 4,555,197 A | * | 11/1985 | Erickson ....................... 403/1 |
| 4,812,094 A | | 3/1989 | Grube |
| 5,366,300 A | * | 11/1994 | Deane et al. ............... 384/585 |
| 5,660,591 A | * | 8/1997 | Reynolds ..................... 464/88 |
| 5,877,952 A | * | 3/1999 | Moriguchi et al. ......... 363/101 |
| 2003/0118399 A1 | | 6/2003 | Schilling et al. |

* cited by examiner

Primary Examiner—Robert E. Pezzuto
Assistant Examiner—Thomas A Beach
(74) Attorney, Agent, or Firm—Scott M. Confer

(57) ABSTRACT

A locking washer for axles on vehicles that prevents a nut from rotational movement relative to the axle. The locking washer includes a sleeve step having central passage with a non-cylindrical section that is rotationally coupled to the axle. The non-cylindrical section may include polygonal lobes or splines that engage a matching shaped portion on the axle. The washer is engaged directly on the shaped portion of the axle instead of the threaded portion of the axle and thereby reduces manufacturing costs and steps by eliminating machining of the threaded portion. The washer being engaged on the shaped portion prevents any relative movements between the axle and the washer from disturbances such as vibration, impact, and rotation.

15 Claims, 4 Drawing Sheets

WHEEL END ASSEMBLY WITH LOCKING FASTENER

FIELD OF THE INVENTION

The present invention relates to a locking fastener to prevent the loosening of a threaded fastener in a fastener joint.

BACKGROUND OF THE INVENTION

Locking washers are commonly used in fastening assemblies to prevent relative motion between the stem and fastened pieces, which may cause a nut to back off the stem, thereby loosening the fastened piece.

Vehicle wheel assemblies commonly include an axle shaft supported for rotation by a knuckle and a wheel bearing disposed between the shaft and knuckle. The assembly is commonly secured by a retaining ring. A disc for mounting a wheel for rotation with the axle shaft is then mounted on the shaft. The disc may integrate a brake rotor and hub flanges into one piece. A locking washer slides against the disc and a nut tightens the locking washer against the disc to prevent relative movement between the axle shaft and the disc, which may cause the nut to back off the axle shaft.

A variety of locking washers known in the art have been used with vehicle wheel assemblies to prevent nut loosening, including split washers and star washers. One problem with using star or split washers in vehicle wheel assemblies is that during operation of the vehicle, these washers may still be subject to movement. Any relative movement may cause the nut to back off, which in turn may cause the wheel to become detached while the vehicle is in motion.

To address these and other deficiencies associated with conventional locking washer configurations, including star or split washers, manufacturers have machined the threaded portion of the axle shaft to create a linear groove extending along its threads. The washer is provided with a spline tang extending into the groove to prevent the washer from rotating relative to the threaded shaft. A similar locking washer uses a flat portion on the inside circumference to lockingly engage a flat plane machined on the external threads. These designs prevent the nut from loosening because the washer cannot rotate around the axle shaft while being subjected to vibration, twisting, expansion, contraction, and other possible movements. However, these designs require additional machining of the threaded portion of the axle shaft. Any extra machining increases manufacturing costs and expense. Moreover, care must be taken in machining the threaded portion of the axle shaft to prevent damage to any threads.

SUMMARY OF THE INVENTION

The present invention is directed to a vehicle wheel assembly having a locking washer and axle shaft configuration that prevents rotational movement of the washer relative to the axle shaft without requiring machining of the threaded portion of the shaft.

The locking washer includes a generally flat outboard face against which the nut tightens. The inboard face of the washer includes an indented portion, which defines members that mate with torque transferring members on the axle shaft. The invention is further directed to a locking washer that has a step portion that allows the washer members to engage the torque transferring members of the axle shaft while securely locking the disc onto the axle shaft.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

I. Construction

Figure 1:
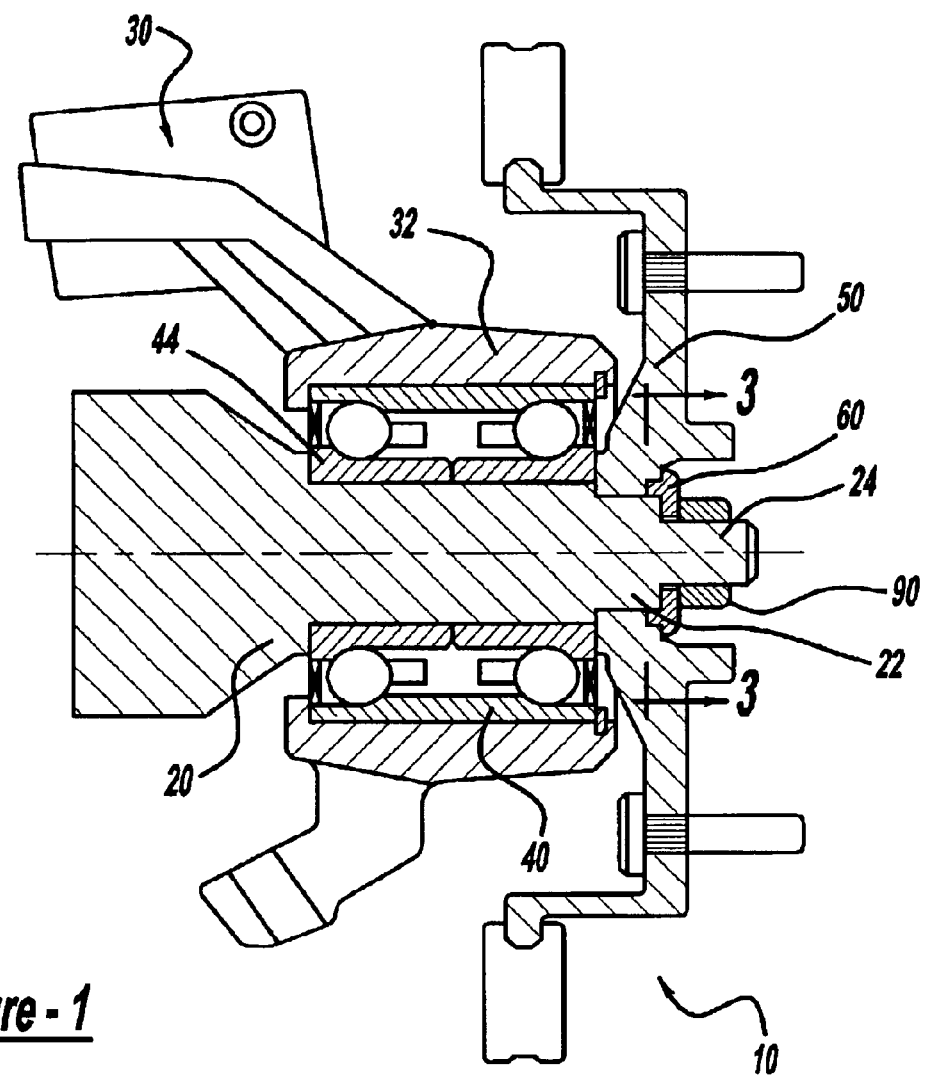
FIG. 1 is a sectional view of a wheel end assembly according to the present invention.
Figure 3:
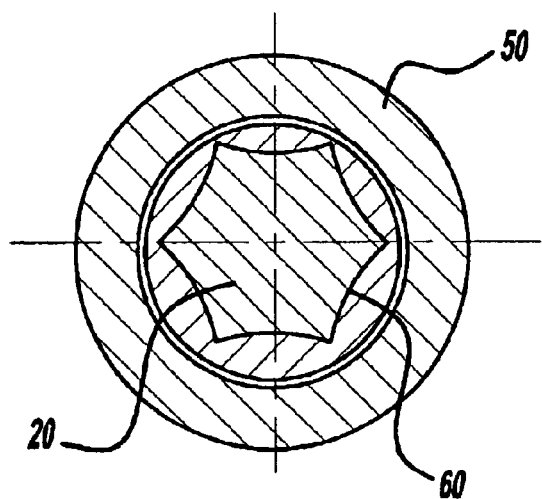
FIG. 3 is a partial sectional view taken along the line 3—3 shown in FIG. 1.

A wheel end assembly 10 constructed in accordance with the preferred embodiment is illustrated in FIG. 1. Conventionally, wheel end assemblies attach a wheel to a vehicle axle 20 and transmit torque from the engine to the wheel. To this end, the wheel end assembly 10 includes an axle support assembly 30, a disc 50 fixed to the wheel, a locking washer 60, and a nut 90. The axle 20 is coupled to the engine of the car through the drive train, passes outward from the center of the car, and is supported for rotation by the axle support assembly 30. The axle support assembly 30 includes a housing or knuckle 32 that forms a cavity within which is disposed a wheel bearing unit 40 to facilitate rotation of the axle 20 relative to the knuckle 32. The axle support assembly 30, wheel bearing unit 40, and disc 50 are secured to the axle 20 by the locking washer 60 and the nut 90, as shown in FIG. 1.

Figure 2:
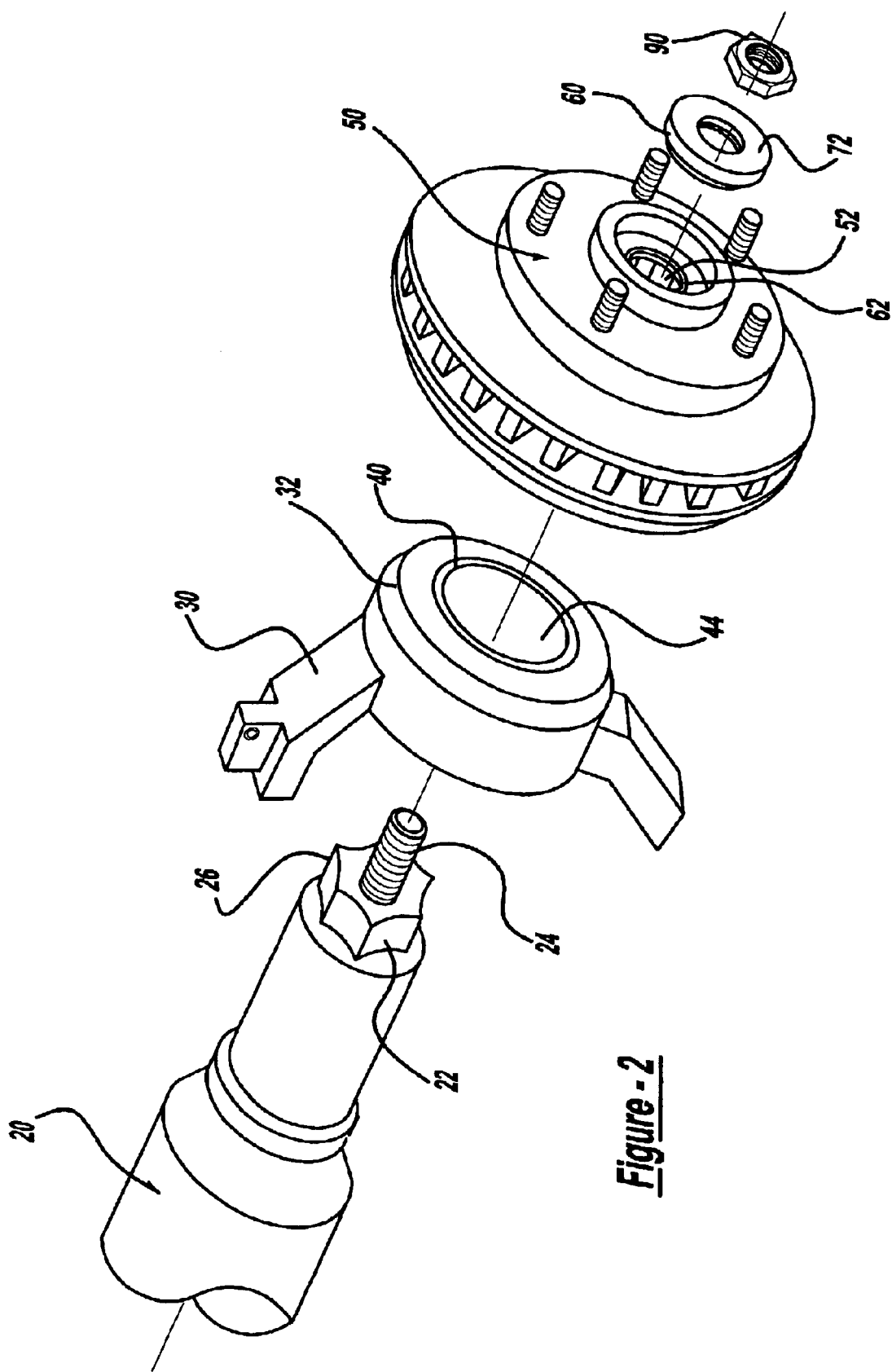
FIG. 2 is an exploded perspective view of the wheel end assembly shown in FIG. 1.

In general, inner bearing rings 44 of the wheel bearing unit 40 and the disc 50 rotate with the axle 20 to drive the vehicle wheel. While a variety of axle, bearing unit, and disc configurations may be used to provide the desired rotational coupling, the illustrated embodiment of the axle 20 includes a shaped portion 22 (FIG. 2) disposable within the wheel bearing unit 40 and the disc 50 and configured to rotationally couple the disc 50 to the axle 20. Notwithstanding the variety of configurations that may be used with the present invention, it is noted that the shaped portion 22 and a cooperating central passage 52 on the disc 50 may provide a friction fit, include cooperating splines (typically twenty-eight to thirty-six splines), or polygonal lobes to rotationally interlock the shaped portion 22 with the disc 50. It should be appreciated that while a single shaped-section 22 is described herein, separate sections of differing configurations may be used without departing from the scope of the invention defined by the appended claims. The axle 20 and inner wheel bearing rings 44 are illustrated as being frictionally coupled, but a variety of other methods may be used. The axle 20 also includes a threaded portion 24 positioned axially outward of the shaped section 22 and having threads configured to cooperate with the internal threading on the nut 90.

Figure 4:
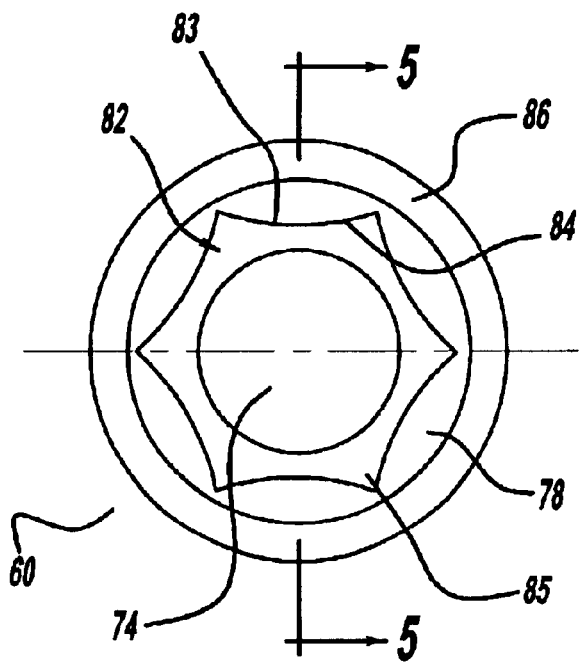
FIG. 4 is an elevational view of the locking washer viewed from axially inward of the washer.
Figure 5:
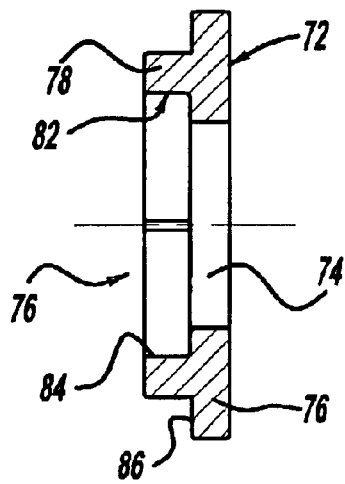
FIG. 5 is a side sectional view of the locking washer taken along the line 5—5 shown in FIG. 4.
Figure 7:
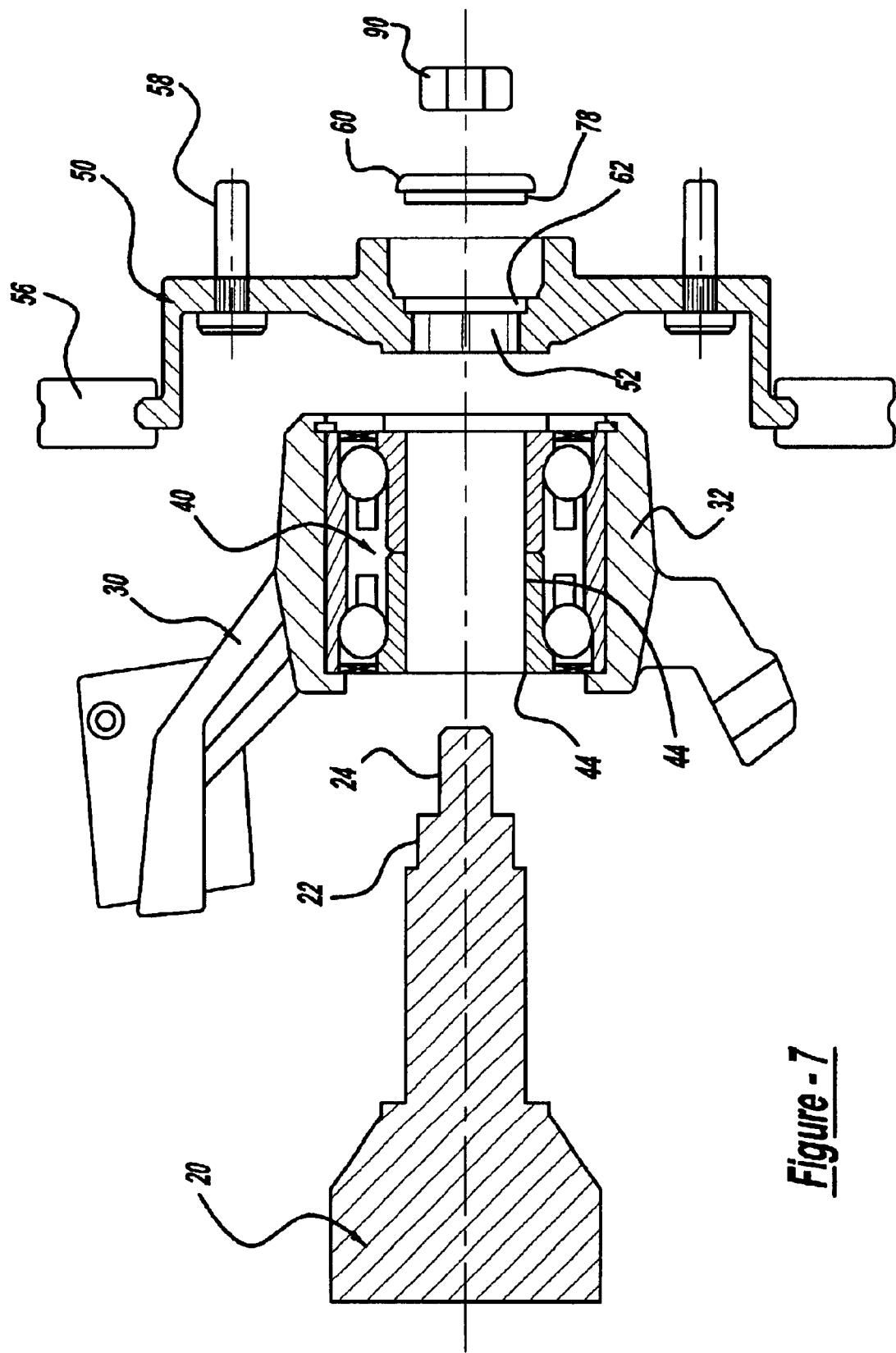
FIG. 7 is an exploded sectional view of the wheel and assembly shown in FIG. 1.

As is best shown in FIGS. 4 and 5, the locking washer 60 includes an axially outer face 72, an inner face 76, a sleeve 78, a central hole 74 sized to receive the axle 20, and a shaped cavity 82 recessed axially from the inner face 76 and communicating with the central hole 74 to define a passage extending through said washer. The cylindrical and inwardly projecting washer sleeve 78 is disposable within a sleeve groove 62 formed in the disc 50 (FIG. 7). The shaped cavity 82 is partially defined by a non-cylindrical outer surface 84 having projections 83 configured to match the cross-sectional configuration of the shaped section 22 of the axle 20. By this arrangement, the washer 60 is rotationally coupled to the axle shaft 20, thereby preventing any rotational movement of the washer 60 relative to the axle shaft 20. The outer face 72 may be scored or include other techniques known in the industry to prevent the nut 90 from rotating relative to the washer 60.

Figure 6:
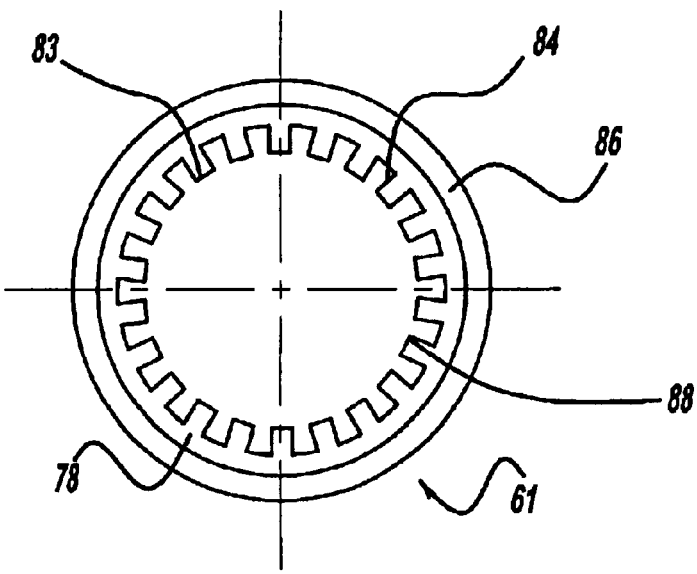
FIG. 6 is an elevational view similar to FIG. 4 illustrating an alternative embodiment of the locking washer.

While the cross-sectional configuration of the shaped cavity 82 and shaped section 22 may vary, exemplary illustrations are shown in FIGS. 4–6. For example, FIGS. 4 and 5 illustrate a sleeve 78 with radially inwardly extending projections 83 in the shape of the polygonal lobes 85 that interact with similarly configured polygonal lobes 26 on the axle 20. Another example may be seen in FIG. 6, where the radially inwardly extending projections in the shape of splines 88 interact with similarly configured splines on the axle 20. The use of polygonal lobes 85 allows for ease of manufacturing the shaft 20 and the washer 60, durability of the lobes 85 throughout the operating life, and ease of assembly in mating the shaft 20, axle support assembly 30, disc 50, and washer 60. Of course it should be easily recognized by one skilled in the art that the configuration, shape, and design of the inner shaped recess 82, projections 83, and outer surface 84 may be formed to interconnect with virtually any non-cylindrical shape or design of the shaped portion 22 on the axle 20. For example, in the embodiments illustrated in FIGS. 4–6, the inner shaped recess 82 completely interconnects, without any gaps, with the shaped portion 22 on the axle 20. However, the shaped recess 82 does not have to mirror the shaped portion 22 completely, but may contain only a portion that interacts with the shaped portion 22 on the axle 20 to prevent any rotational movement of the washer 60 about the axle 20. Further, those skilled in the art will appreciate that complete multiple projections are not required for all embodiments of the invention. For example, the inner shaped recess 82 may define only one lobe 84 that interconnects with the shaped portion 22 on the axle. For many embodiments, no more than one lobe 84 may be needed to prevent rotational movement of the washer 60 relative to the axle shaft 20.

The locking washer 60 may be constructed of any suitable material. In the illustrated embodiment the washer 60 is formed from heat-treated steel with a GEOMET coating applied for corrosion resistance. A GEOMET coating is a water-based chromium-free coating widely used in the auto industry to provide resistance to corrosion. Of course, it should be readily apparent that other materials such as a mild steel or aluminum may be used to form the washer. It also should be readily apparent that the coating may be zinc, black oxide, or some other corrosion-resistant material and that the washer 60 may even be formed without any coating.

II. Manufacturing Process

The manufacturing process for the axle 20, axle support assembly 30, wheel bearing unit 40, disc 50, and nut 90 are well known in the art. For axles 20 with a polygonal shaped portion 22, conventional manufacturing processes may be used, such as counter-rotational machining.

The locking washer 60 may be formed by a variety of techniques well known in the art for forming washers. In the preferred embodiments, the locking washer 60 may be formed by machining but other processes may be used. When machining the washer, a blank having the size and shape of the washer may be formed. Next, the blank may be machined to form the outer groove 80, inner shaped recess 82, and hole 74. Of course, one skilled in the art should recognize that there is no particular order to machine the washer 60. Other techniques well known in the art for fasteners that are suitable for fabricating the washer 60 include stamping, powder metallurgy, and cold heading.

III. Assembly on a Vehicle

The wheel end 10 may be assembled in a manner readily apparent to those skilled in the art. For example, once the axle 20 is interconnected into the vehicle drive train (not shown) and the wheel bearing 40 is placed within the knuckle 32, the knuckle 32 and bearing unit 40 may be slid onto the axle 20. The knuckle 32 may then be attached to the vehicle suspension system (not shown) or the vehicle frame (not shown). Next, the disc 50 is rotationally aligned with and inserted onto the shaped axle section 22 and engaged on the lobes 26 or splines. The locking washer 60 is then placed onto the axle 20 with the projections 83 (e.g., washer lobes 85) aligned to engage against the shaped portion 22 and prevent rotation of the locking washer 60 relative to the axle 20. The sleeve 78 of the washer 60 fits within the sleeve groove 62 on the disc 50. In the illustrated embodiment the sleeve 78 is not in contact with the disc 50, but the washer 60 contacts the disc 50 at the disc contact surface 86. The nut 90 is then threaded onto the axle 20 and tightened so that the axle support assembly 30, disc 50, and locking washer 60 are all firmly held on the axle 20. Because the locking washer 60 is engaged with the shaped portion 22 on the axle 20, it is prevented from rotating or transferring vibrational movements from the disc 50 to the nut 90, preventing the nut 90 from backing off.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A wheel end assembly comprising:
   an axle having a threaded portion and a shaped portion;
   a locking washer including a sleeve defining a non-cylindrical shaped cavity, said shaped cavity engaging said shaped portion to rotationally couple said locking washer to said axle; and
   a disc having a passage, said passage operatively engaging said shaped portion to rotationally couple said locking washer and said disc to said shaped portion, said locking washer retaining said disc on said axle.

2. The wheel end assembly of claim 1 wherein said locking washer defines a central passage extending axially through said washer, said central passage including said shaped cavity and a central hole, said central hole being diametrically smaller than said shaped cavity.

3. The wheel end assembly of claim 1 wherein the locking washer further includes a flange extending radially beyond said sleeve.

4. The wheel end assembly of claim 1 wherein said sleeve includes a radially inwardly extending projection.

5. The wheel end assembly of claim 4 wherein said radially inwardly extending projection includes a polygonal lobe.

6. The wheel end assembly of claim 5 wherein said shaped portion includes a polygonal lobe, said polygonal lobe on said shaped portion engaging said polygonal lobe on said washer.

7. The wheel end assembly of claim 1 wherein said shaped portion and said sleeve each include a spline, said sleeve spline engaging said spline on said shaped portion to rotationally couple said washer to said axle.

8. The wheel end assembly of claim 1 wherein said disc includes a sleeve groove, said locking washer sleeve disposed within said sleeve groove.

9. The wheel end assembly of claim 1 wherein said threaded section of said axle is axially outward of and diametrically smaller than said shaped portion, said threaded section disposed in said central hole of said washer.

10. The wheel end assembly of claim 1 wherein said disc further includes mounting elements for receiving a wheel.

11. The wheel end assembly of claim 1 further including a nut disposed on said threaded portion.

12. The wheel end assembly of claim 11 wherein said nut and said washer are located outboard said disc on said axle.

13. The wheel end assembly of claim 1 wherein said disc is directly connected to said axle.

14. The wheel end assembly of claim 1 wherein said shaped portion of said axle directly transfers forces to said central passage on said disc.

15. The wheel end assembly of claim 13 wherein said central passage and said shaped cavity are interlocked with said shaped portion of said axle.

* * * * *